(12) United States Patent
Fenney et al.

(10) Patent No.: US 8,116,579 B2
(45) Date of Patent: Feb. 14, 2012

(54) METHOD AND SYSTEM FOR DATA COMPRESSION

(75) Inventors: Simon Fenney, Hertfordshire (GB); Nico Ritsche, Hertfordshire (GB)

(73) Assignee: Imagination Technologies Limited, Hertfordshire (GB)

(*) Notice: Subject to any disclaimer, the term of this patent is extended or adjusted under 35 U.S.C. 154(b) by 1127 days.

(21) Appl. No.: 11/978,937

(22) Filed: Oct. 30, 2007

(65) Prior Publication Data
US 2009/0046937 A1    Feb. 19, 2009

(30) Foreign Application Priority Data

Aug. 17, 2007 (GB) .................................. 0716158.1
Oct. 5, 2007 (GB) .................................. 0719556.3

(51) Int. Cl.
*G06K 9/46* (2006.01)
(52) U.S. Cl. ..................... 382/240; 382/234; 382/246
(58) Field of Classification Search .............. 382/240,
382/248, 232, 233, 239, 251, 238, 246, 234,
382/181, 190; 348/395.1, 398.1; 375/E7.03,
375/240, 240.19; 708/209, 523; 342/179,
342/197; 712/222, 300; 341/58, 59
See application file for complete search history.

(56) References Cited

U.S. PATENT DOCUMENTS

| | | | | |
|---|---|---|---|---|
| 4,956,863 A * | 9/1990 | Goss | ............................... | 380/30 |
| 5,491,479 A * | 2/1996 | Wilkinson | ........................ | 341/58 |
| 6,546,480 B1 * | 4/2003 | Mandavilli et al. | ............ | 712/222 |
| 6,574,651 B1 * | 6/2003 | Cui et al. | ...................... | 708/523 |
| 6,629,115 B1 * | 9/2003 | Rossignol | ...................... | 708/209 |
| 6,658,159 B1 * | 12/2003 | Taubman | ...................... | 382/240 |
| 6,888,891 B2 * | 5/2005 | Lee et al. | .................. | 375/240.19 |
| 7,003,168 B1 | 2/2006 | Chao et al. | | |
| 7,693,339 B2 * | 4/2010 | Wittenstein | .................... | 382/238 |
| 7,826,527 B2 * | 11/2010 | Wang | ............................. | 375/240 |
| 2007/0116369 A1 | 5/2007 | Zandi et al. | | |

FOREIGN PATENT DOCUMENTS

| | | |
|---|---|---|
| GB | 2451911 B | 2/2009 |
| JP | 9139943 | 5/1997 |
| WO | WO 01/20897 A1 | 3/2001 |
| WO | WO 01/91454 A2 | 11/2001 |
| WO | WO 2004/045217 A1 | 5/2004 |
| WO | WO 2005/008595 A1 | 1/2005 |

OTHER PUBLICATIONS

"Texture Compression Using Low-Frequency Signal Modulation", S. Fenney, Graphics Hardware 2003.
"Exact and Error-Bounded Approximate Color Buffer Compression and Decompression", Rasmusson, Hasselgren & Akenine-Moeller, Graphics Hardware 2007.
"Building Your Own Wavelets at Home" Wim Sweldens and Peter Schroeder, 1996.

(Continued)

*Primary Examiner* — Anh Hong Do

(74) *Attorney, Agent, or Firm* — Flynn, Thiel, Boutell & Tanis, P.C.

(57) ABSTRACT

A method and an apparatus for compressing or decompressing two-dimensional electronic data are provided. The method for compressing the two-dimensional electronic data set includes dividing the data set into data arrays, performing a wavelet transformation on each array to provide a plurality of wavelet coefficients, and encoding at least some of the wavelet coefficients using an entropy encoding scheme. Each data array preferably relates to a separate and continuous area of an image.

30 Claims, 12 Drawing Sheets

OTHER PUBLICATIONS

YCoCg-R: A Color Space with RGB Reversibility and Low Dynamic Range, Henrique Malvar and Gary Sullivan, Microsoft Corp, JVT Pext Ad Hoc Group Meeting; Jul. 22-24, 2003, Trondheim.

"A Reversible Color Transform for 16-Bit-Color Picture Coding", Li, et al, Proceedings of the 12$^{th}$ Annual ACM International Conference on Multimedia, 2004.

International Search Report dated Apr. 28, 2009 (2 pages).

Wikipedia, "Wavelet Compression" [online], Mar. 11, 2004, available from http://web.archive.org/web/20040311165156/http://en.wikipedia.org/wiki/Wavelet_compression accessed on Feb. 20, 2008.

Christopoulos, C. "The JPEG2000 Still Image Coding System: An Overview", IEEE Transactions on Consumer Electronics (2000), vol. 46, No. 4, p. 1103-1127.

* cited by examiner

Encoding scheme 1 (offset by 128)

Encoding scheme 2 (offset by 128)

Encoding scheme 3 (offset by 128)

METHOD AND SYSTEM FOR DATA COMPRESSION

FIELD OF THE INVENTION

This invention relates to a method and system for data compression of two-dimensional data. In particular, the invention relates to data compression in a graphics rendering system that reduces memory bandwidth.

BACKGROUND OF THE INVENTION

Data compression, both lossless and lossy, is highly desirable in many applications including graphics frame buffers where large amounts of data are to be stored and read out. With the increasing use of graphics in small devices such as mobile communication devices the use of compressed data is therefore highly desirable.

General lossy image compression, when applied to an entire image, is well known in computer graphics with such standards as JPEG and GIF. Less commonly used are lossless image compression methods such as PNG, although any lossless compression tool, such as Compress or ZIP could be applied to an uncompressed source. The problem with all of these methods, however, is that a) they are expensive for on-the-fly compression and decompression and b) do not allow random access to data.

Some lossy compression schemes, such as those specifically designed for texture compression (A review of several known schemes is given in "Texture Compression using Low-Frequency Signal Modulation", S. Fenney, Graphics Hardware 2003), do provide random access to data and simple decompression steps. A major shortcoming of these methods, however, is that the compression algorithm is far more expensive than the decompression algorithm, (i.e. they use asymmetric encoding and decoding), and thus are not suitable for real-time operations. It is also difficult to adapt these methods to provide lossless compression.

With the exception of Rasmusson et al's system, (described shortly), symmetric (i.e. approximately equal encoding and decoding costs), real-time compression systems for data buffers (such as frame and Z buffers) have so far been limited to quite simple schemes. A review of such systems can be found in "Exact and Error-bounded Approximate Color Buffer Compression and Decompression" (Rasmusson, Hasselgren, & Akenine-Möller, Graphics Hardware 2007).

Rasmusson et al. also present a more advanced compression and decompression system for RGB data, but this requires expansion of the dynamic range of the numerical values, which incurs a cost in terms of register sizes. The system also only uses a sequential prediction scheme which prevents parallel calculation.

It is an object of the present invention to provide a method and system that goes some way towards solving the above problems.

SUMMARY OF THE INVENTION

In a first aspect, the invention is a method for compressing an electronic two-dimensional data set comprising the steps of:
dividing the data set into data arrays;
performing a wavelet transformation on each array to provide a plurality of wavelet coefficients;
encoding at least some of the wavelet coefficients using an entropy encoding scheme.

Preferably, the electronic data set is an image data set. Preferably, each data array corresponds to a separate and continuous area of an image. In effect, the dividing step is then dividing the image into tiles. The tiles may be of an arbitrary size and shape, but are preferably rectangular.

Preferably, the method further includes the step of converting the data set into a predetermined data format prior to performing the wavelet transformation. Preferably, the predetermined data format is an 8-bit unsigned integer data format. Preferably, the step of converting the data set includes the step of splitting larger data units into a plurality of smaller data units.

Preferably, the step of splitting larger data units comprises the step of splitting the larger data units into a plurality of separate data channels.

Preferably, the step of performing a wavelet transformation is performed using modulo arithmetic. Preferably, the modulo arithmetic corresponds to a predetermined data format.

Preferably, the step of performing a wavelet transformation and the step of encoding are performed on different data arrays in parallel.

Preferably, the data set is a single data channel of a multiple data channel image, and each of the method steps is performed on a plurality of the data channels. The image may comprise colour data and the method may further include the step of converting the colour data into a different colour space using a colour transform. The conversion of the colour data into a different colour space may be carried out prior to performing a wavelet transform. Alternatively, the step of converting the colour data is carried out after performing a wavelet transform, and comprises the steps of carrying out a plurality of alternative colour transformation to produce a plurality of results and choosing the best result for encoding.

Preferably, the colour transformation is performed using the modulo arithmetic.

Preferably, the wavelet transformation is a second generation wavelet. Preferably, the wavelet transformation does not include an update step. The removal of the update step is perfectly sound when using a lossless transformation.

Preferably, the method further includes the step of assessing the wavelet coefficients, and selecting an entropy encoding scheme on the basis of the results of the assessment of the wavelet coefficients. Preferably, the coefficients are assessed for each array and an encoding scheme chosen for each array. Preferably, the step of assessing comprises the step assessing a distribution of the wavelet coefficients.

Preferably, the wavelet transformation is a linear Wavelet transformation. Alternatively, the wavelet transformation may be a Haar transformation. Preferably the wavelet coefficients are computed using a lifting scheme.

Preferably, the step of performing a wavelet transformation includes performing a plurality of the wavelet transformation operations on each data array. Preferably, a first wavelet transformation operation is a Haar transformation operation.

According to a second aspect, the invention is a system for compressing an electronic two-dimensional data set comprises:
means for dividing the data set into a plurality of data arrays; and
a compressor unit, the compressor unit including means for performing a wavelet transformation on each data array to output a plurality of wavelet coefficients for each data array, and encoding means for encoding at least some of the plurality of wavelet coefficients using an entropy encoding scheme.

Preferably, the system is part of a graphics rendering system. Preferably, the electronic data set is an image data set. Preferably, each data array corresponds to a separate and continuous area of an image.

Preferably, the system further includes a reformatting unit for converting the data set into data channels having a predetermined data format prior to performing a wavelet transformation.

Preferably, the system further includes colour transformation means for performing a colour transformation on colour image data.

Preferably, the means for performing a wavelet transformation uses modulo arithmetic.

Preferably, the system further includes assessing means for assessing the wavelet coefficients and selecting an entropy encoding scheme on the basis of the assessment of the wavelet coefficients.

According to third aspect, the invention is a method of decompressing an electronic two-dimensional data set comprising the steps of:
 decoding the data set using at least one entropy decoding scheme to produce a plurality of sets of coefficients;
 performing an inverse wavelet transformation on the coefficients to produce a plurality of data arrays; and
 joining the plurality of data arrays to produce the two-dimensional data set.

Preferably, the electronic data set is an image data set. Preferably, each data array corresponds to a separate and continuous area of an image.

According to a fourth aspect, the invention is an apparatus for decompressing an electronic two-dimensional data set comprising:
 a decompressor unit including means to decoding the data set using at least one entropy decoding scheme to produce a plurality of sets of coefficients and means to performing an inverse wavelet transformation on the coefficients to produce a plurality of data arrays; and
 means for joining the plurality of data arrays to produce a two-dimensional data set.

Preferably, the apparatus is part of a graphics rendering system. Preferably, the electronic data set is an image data set. Preferably, each data array corresponds to a separate and continuous area of an image.

According to a fifth aspect, the invention is a method for compressing an electronic two-dimensional data set comprising the steps of:
 dividing the data set into data arrays;
 performing a wavelet transformation on each array to provide a plurality of wavelet coefficients for each array;
 processing each plurality of coefficients to produce a value for each array; and
 selecting an encoding scheme for each array based on the value for that array.

Preferably, the step of selecting an encoding scheme comprises the step of selecting one encoding scheme from a set of possible encoding schemes, and one of the encoding schemes comprising the step of excluding any encoding scheme.

Preferably, the electronic data set is an image data set. Preferably, each data array corresponds to a continuous area of an image.

According to a sixth aspect, the invention is an apparatus for compressing an electronic two-dimensional data set, comprising:
 means for dividing the data set into a plurality of data arrays; and
 a compressor unit including means for performing wavelet transformation on each data array to output a a plurality of wavelet coefficients for each data array, a processor for processing the coefficients to produce a value for each array, and selecting means for selecting based on the value an encoding scheme for encoding the wavelet coefficients.

Preferably, the apparatus is part of a graphics rendering system. Preferably, the electronic data set is an image data set. Preferably, each data array corresponds to a continuous area of an image.

According to a seventh aspect, the invention is a method for compressing an electronic two-dimensional data set comprising the step of:
 performing a wavelet transformation on the data set uses a modulo arithmetic to produce a plurality of coefficients; and
 encoding the coefficients using an entropy code.

According to an eighth aspect, the invention is a method for compressing an electronic two-dimensional data set comprising the step of:
 performing a wavelet transformation on the data set to provide a plurality of coefficients, and
 encoding the coefficient using an entrorpy code,
 wherein the wavelet transformation does not include an update step.

BRIEF DESCRIPTION OF THE DRAWINGS

Examples of the invention will now be described in detail with reference to the accompanying drawings, in which.

DETAILED DESCRIPTION

Figure 1:
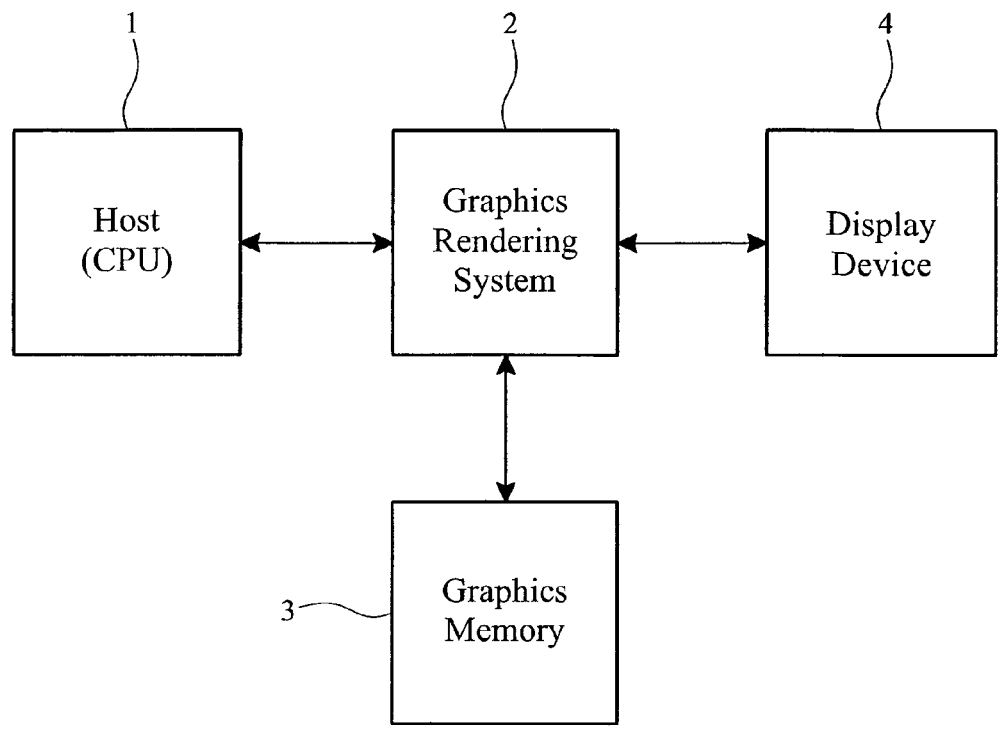
FIG. 1 is a schematic illustration of a graphics rendering system in accordance with the present invention.

FIG. 1 is a schematic illustration of a graphics rendering system in an electronic device. A CPU 1 communicates with a graphics rendering subsystem 2, which accesses buffer data, such as framebuffer and geometry information stored in a graphics memory 3. Rendered images stored in the memory may then be transferred to an output device 4, such as a display.

In a rendering system in accordance with the invention, a channel of image data, which can be thought of as a two-dimensional data set, is divided into a series of arrays or tiles. Each tile is compressed individually. The size of the tiles may be arbitrarily chosen, but power of 2 dimensions are preferable, and need not be uniform. The size of the tiles chosen represents a balance between improving compression rate (large tiles) and lower latency and smaller internal data storage size (small tiles). It has been found that a tile size of around 32×32 pixels is a good compromise for most practical applications. The image data can be set of scalar values and/or vectors.

Figure 2:
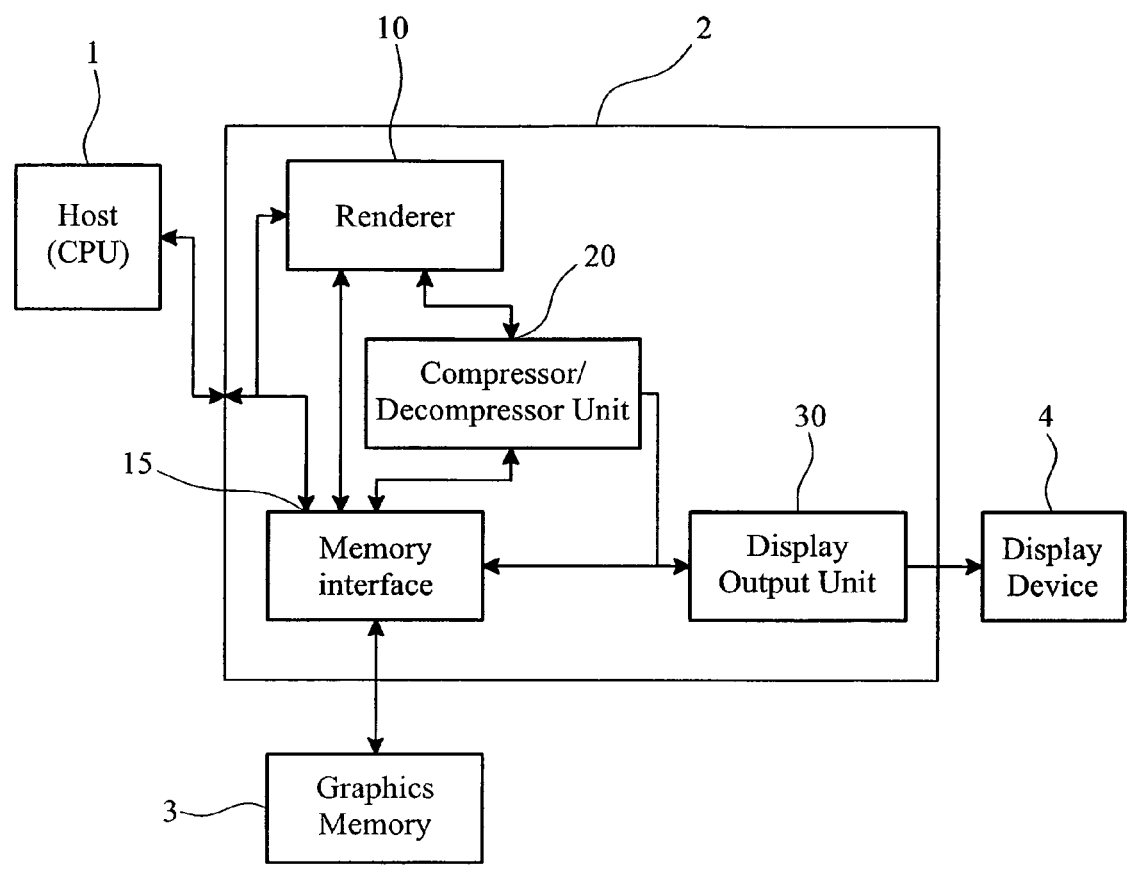
FIG. 2 shows the graphics rendering system of FIG. 1 in more detail.

FIG. 2 shows the rendering system of a preferred embodiment of the invention in more detail. The graphics rendering system 2 includes a renderer 10, a compressor/decompressor unit 20, memory interface 15 and a display output unit 30. The renderer 10 performs scan conversion of graphics primitives, such as triangles and lines, using known techniques such as Z-tests and texture mapping. The renderer operates in a tile-based order. The renderer may contain cache units to reduce memory traffic. Some data is read or written by the renderer, directly to the graphics memory 3 via the memory interface unit 15 but for other data, such as the framebuffer, it preferably goes via the compressor/decompressor unit 20. This unit reduces the amount of data that needs to be transferred across the external memory bus. The compressor/decompressor unit 20 has access to the memory interface unit 15. The display output unit 30 sends completed image data to the display device 4. This may be an uncompressed image, in which case it is accessed directly from the memory interface unit 15 or it may be compressed data, in which case it will be accessed via the compressor/decompressor 20. Although shown as a single entity, the compressor/decompressor unit 20 may contain multiple parallel compression/decompression units for enhanced performance reasons.

Figure 3:
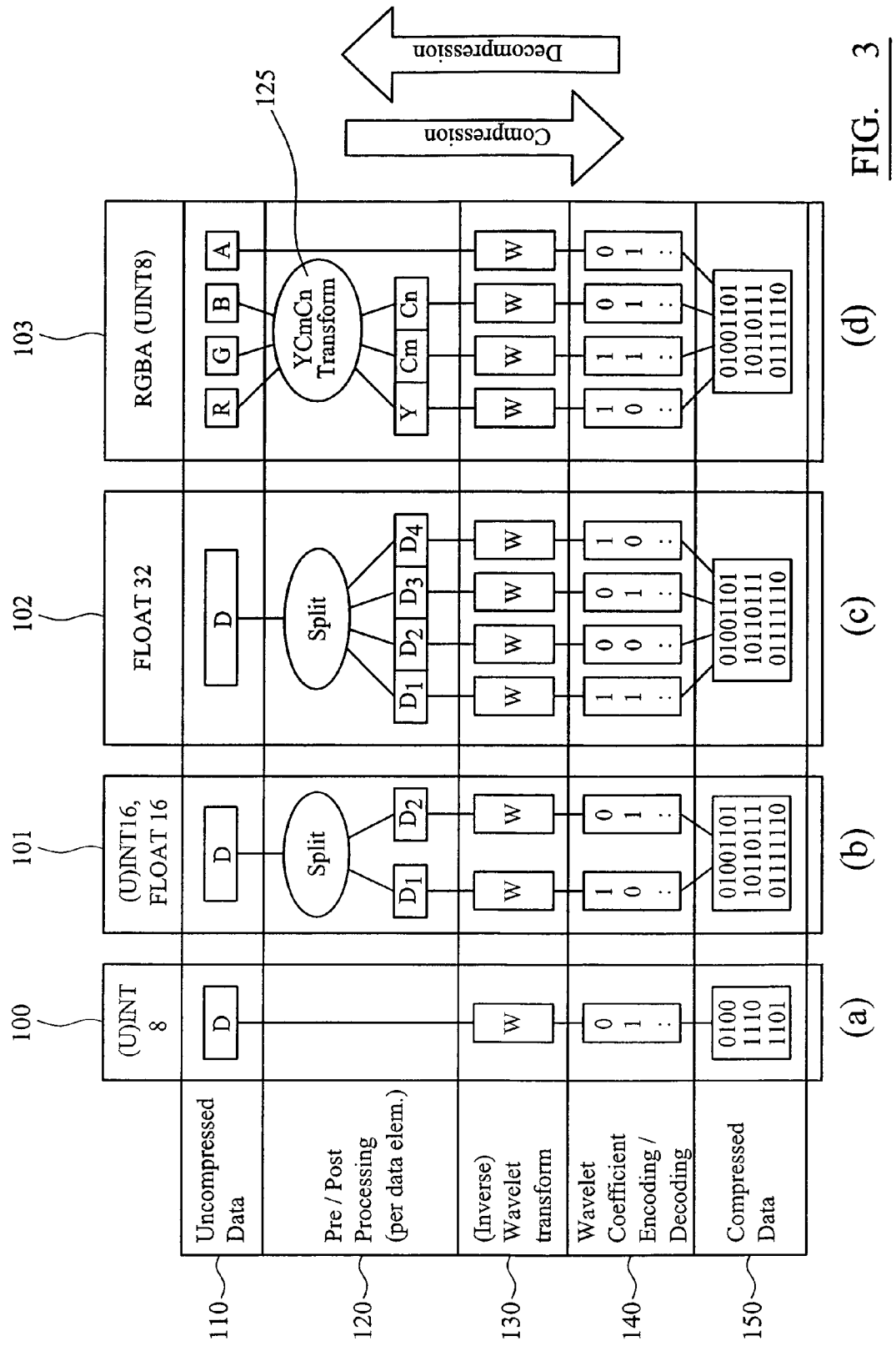
FIG. 3 is a schematic diagram illustrating the method steps of one embodiment of the invention, for different data channels.

FIG. 3 is a schematic illustration of a lossless compression method to be performed by the compressor/decompressor unit 20 in accordance with the present invention. FIG. 3 illustrates the compression method for different data formats, with different data formats shown in separate columns, (a), (b), (c) and (d). The method steps for data compression are illustrated in order from the top of the figure to the bottom. For data decompression, the steps are simply reversed and so are shown from the bottom of the page to the top.

In this example, the compression method works on 8-bit unsigned data. This is shown in column (a). Other data formats, such as 16-bit floating point data (FLOAT16) and 16-bit signed integer data ((U)INT16), as shown in column (b), and 32-bit floating point data (FLOAT32), as shown in column (c), are first split into unsigned 8-bit unsigned integer data (UINT8) channels. This is illustrated as step 120.

Column (d) illustrates the method for RGB(A) colour data. RGB(A) colour data may advantageously be transformed into a different colour space, in this example, a YCmCn colour space, or transformed using the JPEG-LS transformation, as will be described in further detail. This transformation step 125 is shown as preceding the wavelet transformation step but may be performed subsequent to the wavelet transformation step. The different channels of colour data are 8-bit unsigned integer data channels. If an alpha channel, A, is included in the RGB(A) data, it is encoded independently of the colour transformation.

The 8-bit unsigned integer data is then transformed using a wavelet transform. In this example the transformation is a linear wavelet transformation using the lifting scheme described in "Building Your Own Wavelets at Home" Wim Sweldens and Peter Schröder, 1996, http://citeseer.ist.psu.edu/sweldens96building.html.

The coefficients are then encoded using an entropy encoding scheme, shown as step 140. The result is compressed data as shown in step 150. In the preferred embodiment there are four choices for encoding each tile. The coefficients may be encoded using one of three variable length entropy encoding schemes or they may be left unencoded. They will be left unencoded if none of the encoding schemes actually compresses the data.

Figure 4:
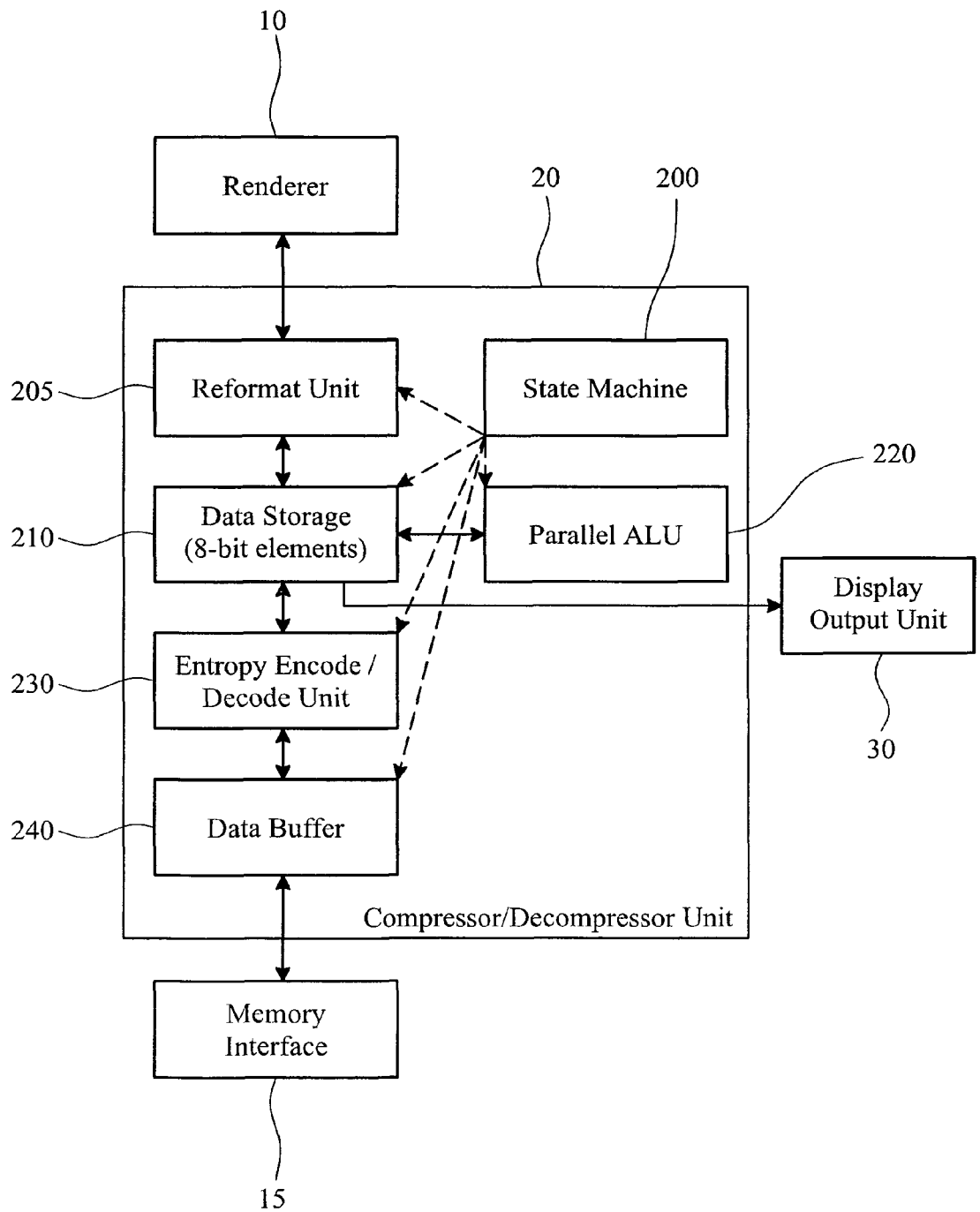
FIG. 4 is a schematic illustration of a compressor/decompressor unit as shown in FIG. 2.

A compressor/decompressor unit 20 that can perform these tasks is shown schematically in FIG. 4. The process steps of the unit are controlled by a state machine 200 that coordinates all operations inside the compression/decompression unit. Referring to the compression process, the output of the renderer 10 is fed to a reformatting unit 205 that performs trivial demultiplexing of the data. This corresponds to parts of step 120 of FIG. 3. The reformatted data is then held in a storage area 210 that preferably consists of a register file that provides parallel access to many data elements every clock cycle. Attached to the data store is a 'parallel' arithmetic logic unit (ALU) 220 that performs the operations needed for the colour transform, corresponding to step 125 of FIG. 3, and the wavelet transform corresponding to step 130 of FIG. 3. This unit, for performance reasons, performs operations on many channels and or pixels in parallel.

Also connected to the data store, 210, is the entropy encoding/decoding unit 230, which performs entropy encoding on the coefficients that result from the colour and wavelet transformations. This corresponds to step 140 of FIG. 3. The variable length encoded data is written to a data buffer 240 before being transferred to memory via the memory interface 15.

Decompression is the reverse of these steps. The display output unit 30 also has access to the data storage 210 to allow display of compressed buffers.

Preferred embodiments of each of the steps will now be described in more detail. The first stage of the compression algorithm common to all data types is a wavelet transformation using, primarily, a linear wavelet. In this example, the wavelet's coefficients are computed in place of the uncompressed data array using the lifting-based scheme similar to that described in Sweldens and Schröder] ("Building Your Own Wavelets at Home" Wim Sweldens and Peter Schröder, 1996, http://citeseer.ist.psu.edu/sweldens96building.html). The update step in this scheme is omitted for efficiency reasons as the inventors have found it to have either a negligible benefit (~1%) on the compression ratio (for images) or it reduced it (for z-buffer data).

For each level of the wavelet transformation, the two-dimensional data array is transformed first in the horizontal and then in the vertical direction. Unlike standard wavelet approaches, the preferred embodiment also generally avoids applying the transformation to differences already computed in previous steps as this resulted in negligible measured improvements for image data. Exceptions to this are described later.

Figures 5A, 5B:
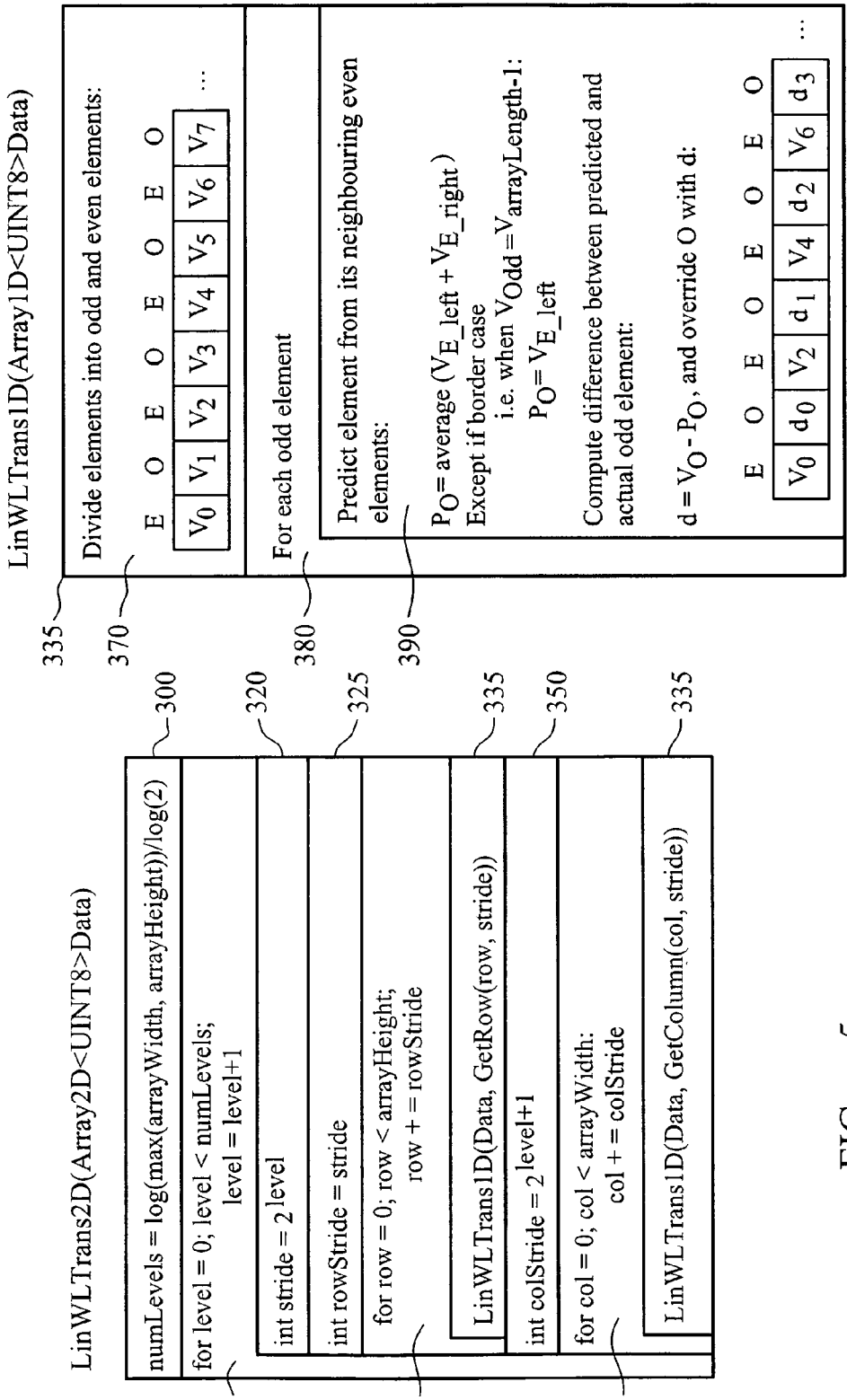
FIGS. 5a and 5b show pseudo code for performing a wavelet transformation.

The pseudo code in FIG. 5*a* illustrates the process as applied to one data channel. In step 300, the number of processing iterations/levels is determined. Step 310 'loops' through these levels and contains sub-steps 320, 325, 330, 350 and 360. Steps 320 and 325 determine the subset of the rows that are to be processed at this level. Step 330 addresses each row in the current subset of rows and performs the wavelet process 335 on a subset of the data in each row.

Subsequently, step 350 determines which subsets of the columns of the data are to be processed at this level, and step 360 steps through those columns, again performing the wavelet process 335 on a subset of the pixels in that column.

Although described iteratively, all the rows in step 330 can be treated independently by the wavelet process 335 and thus could run in parallel. Similarly, the column iterations of 360 could also be done in parallel. Furthermore, the various data channels are also independent and so can be operated on in parallel.

Throughout the whole wavelet transformation, computed values are stored using only 8-bit arithmetic. This means computation results outside the [0,255] range are mapped back into [0,255]. Mathematically this is equivalent to performing all operations modulo 256. In a computer system, this mapping can be achieved automatically by simply only keeping the least significant 8-bits of any computed result.

The wavelet process 335 will now be described in more detail with reference to FIG. 5b. The set of values supplied to the wavelet process are divided into 'even' and 'odd' sets 370. Each odd value is then processed 380 using a 'lifting' step 390. This can be done iteratively or in parallel, as the lifting step is independent for each odd pixel. The lifting 390 is comprised of the following steps:
  a. Prediction. For the linear wavelet, the neighbouring even values are used to estimate a likely value for the odd value by taking the average of the two even values. This is shown in simplified form in the diagram. In this embodiment it has been adapted to use the "ClosestAverage" function, described in detail later, which as been adapted to work with modulo 256 mathematics. In other embodiments, it may be selectable depending on the data being processed.
  b. At the last odd pixel, however, there is only one available even neighbour (the previous one) and so that value is used as the prediction.
  c. The difference of the odd value and its predicted value is written back into the odd pixel's storage location.

The wavelet process used in this embodiment skips out the standard 'update' phase, wherein the even values are modified.

To recover the original data from the computed wavelet coefficients, the inverse wavelet transformation is simply the reverse of all involved steps. This means the transformation is done from the wavelets highest to its lowest level, where for each level the columns are processed followed by the rows. The data is recovered by restoring the odd elements from the stored differences and the predicted values that use the neighbouring even elements. In pseudo code this is:

```
for level = highestWLLevel down to 0
{
    for each column in level
    {
        for each odd element
        {
            if not border element then
                predicted = average(evenLeft, evenRight)
            else
                predicted = evenLeft
            endif
            element = element + predicted;
        }
    }
    for each row in level
    {
        .
```

```
        recover odd elements as above
        .
    }
}
```

Note that "left" and "right" in the columns is interpreted as "above" and "below". The 'average' function, mentioned in the above pseudo code, has been adapted to function with modulo arithmetic and will be described in detail later.

The coefficients resulting from the optional colour transformation and wavelet transformation are encoded using a variable length entropy encoding scheme. The data array is compressed in a tile based manner, i.e. the data array is sub-divided into equally sized tiles and each tile is compressed independently. In the preferred embodiment, there are four choices of encoding scheme for each tile: either its wavelet coefficients are encoded using one out of three entropy encoding schemes or, if they are not compressible with these schemes i.e. if they would result in expansion rather than compression, they are not encoded at all and instead output simply as 8-bit values. In the latter case no compression is achieved for the tile, but this is favoured over a scheme that expands the data.

In the following description of the entropy encoding schemes, the values of the wavelet coefficients have been offset by 128 so that 'zero' effectively appears in the centre of the histograms. Primarily this has been done to make it easier for human interpretation. The encoding shown in the figures also assumes this distribution. Note that this 'addition' of the +128 (which trivially equates to inverting the top bit of each 8-bit value) is not necessary for the invention and, provided the entropy encoding schemes are adjusted accordingly, an equally effective embodiment could forgo this offset.

The first step of the encoding is choosing the compression scheme or to use no compression. Rather than trying all schemes and choosing the one that produced the smallest output, a much cheaper and simpler heuristic is used. This heuristic counts the number of 0, −1 and 1 coefficients in each tile (stored as 128, 127 and 129 due to the 128 offset) and compares the total against predetermined thresholds. This is illustrated in the following pseudo code.

```
count = 0;
for each coefficient
{
    if (   (coefficient == 128 ) OR
           (coefficient == 127 ) OR
           (coefficient == 129 ) ) then
        count = count + 1;
    endif
}
Const int numCoefficients = tileWidth * tileHeight;
Const int noPackThresh = 0.05 * numCoefficients;
Const int scheme1Thresh = 0.3 * numCoefficients;
Const int scheme2Thresh = 0.9 * numCoefficients;
if ( count < noPackThresh ) then
    encodingScheme = 0;
else if ( count < scheme1Thresh )
    encodingScheme = scheme1;
else if ( count < scheme2Thresh )
    encodingScheme = scheme2;
else encodingScheme = scheme3;
endif
```

Figure 6A:
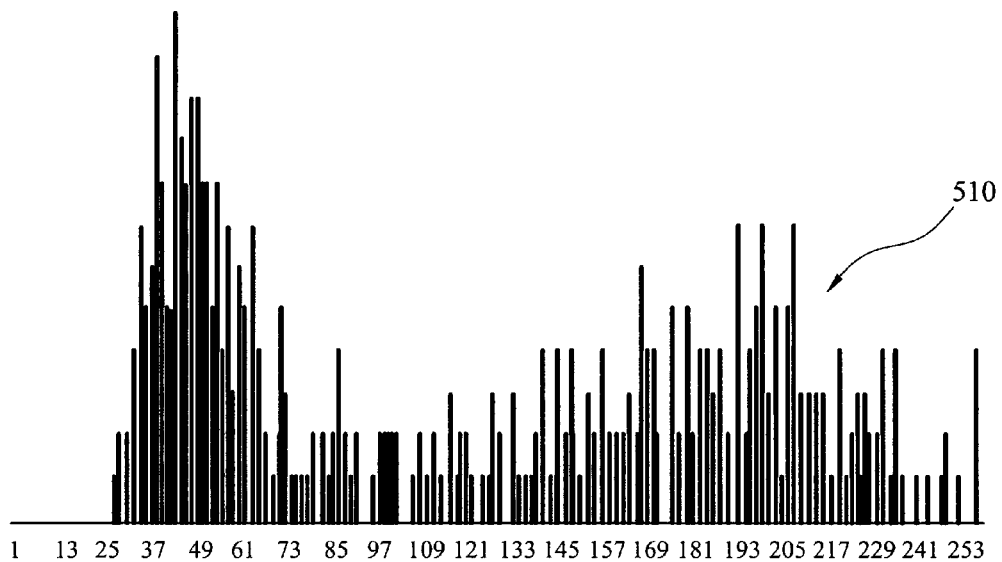
FIG. 6a is a histogram of the red channel of an image tile before wavelet transformation.
Figure 6B:
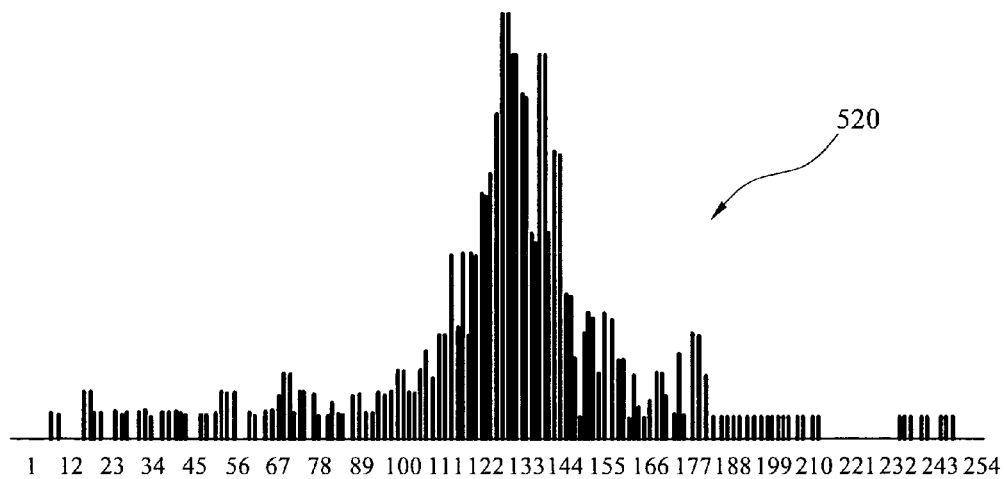
FIG. 6b is a histogram of the red channel of the image tile of FIG. 6a after a wavelet transformation.

The threshold constants given above can be further tuned for particular data types, however they have proven to be a good choice for tested data sets consisting mainly of RGB images, both rendered and photographs. The encoding schemes exploit the fact that the wavelet coefficients are typically clustered around "zero" (mapped to 128 in the examples), forming, more or less, bell-shaped histogram curves. The closer the original data set is to piecewise linear functions, the closer to zero its (linear) wavelet coefficients become. Conversely, more random or noisy data sets have coefficients that form a more evenly distributed histogram. FIG. 6 corresponds to an example tile from an image. Its red channel histogram 510 is shown in FIG. 6a and the corresponding wavelet coefficients histogram 520 is shown in FIG. 6b. Again, the wavelet coefficients have been offset by 128.

Each of the three encoding schemes consists of a partitioning of the 8-bit space ([0,255]) into intervals that form groups. The first group in each scheme has only one interval containing the most common wavelet coefficients clustered around 128 (zero). Subsequent groups consist of two intervals containing the less common wavelet coefficients. Each interval covers a $2^x$ number of coefficient values to maximize storage efficiency. The bit code used for storing a coefficient consists of a group id prefix and a value. Both the group id and the value are of variable length dependent on the group's position and size. The group id consists of zero or more 1's, according to the group position, followed by a 0. An exception is the last group id where the terminating 0 can be omitted. For example, the fourth group id is 1110, when there are more than four groups in a scheme, but 111 in the case where there are only just four groups in a scheme.

Figure 7:
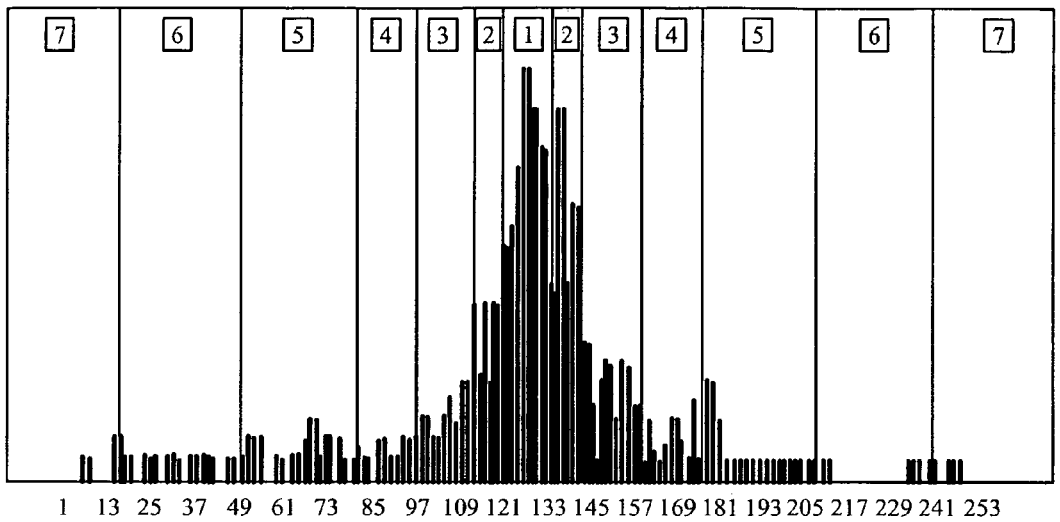
FIG. 7 illustrates a first variable length encoding scheme for use in the present invention.

The group value is the coefficients' position in the group. For example, group 4 in scheme 1, as shown in FIG. 7, has a five bit value field, and so it covers a range of 32 coefficient values. The group consists of two intervals [81, 96] and [161, 176], each containing 16 coefficient values. If the value field thus contained is, for instance, 83, then it belongs to the first interval of group 4 and its group value is '2'. If it is 170, it belongs to the second interval of group 4 and its group value is '25'.

Figure 8:
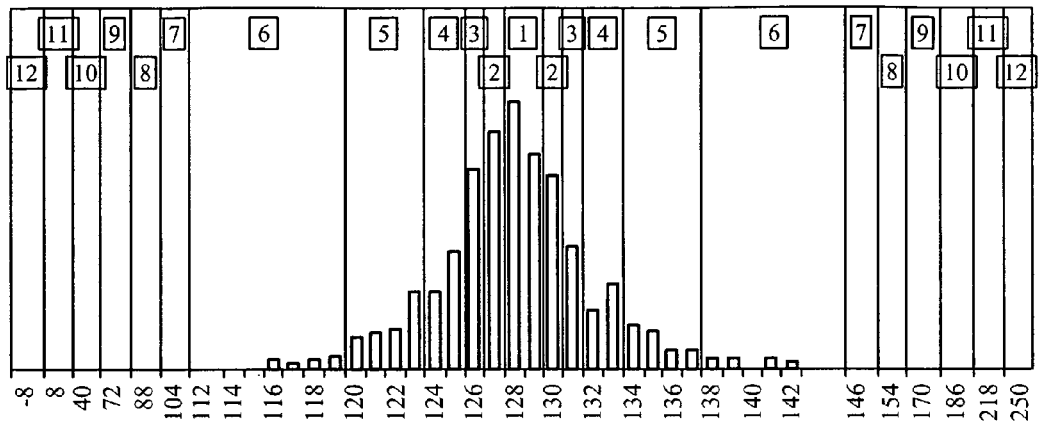
FIG. 8 illustrates a second variable length encoding scheme for use in the present invention.
Figure 9:
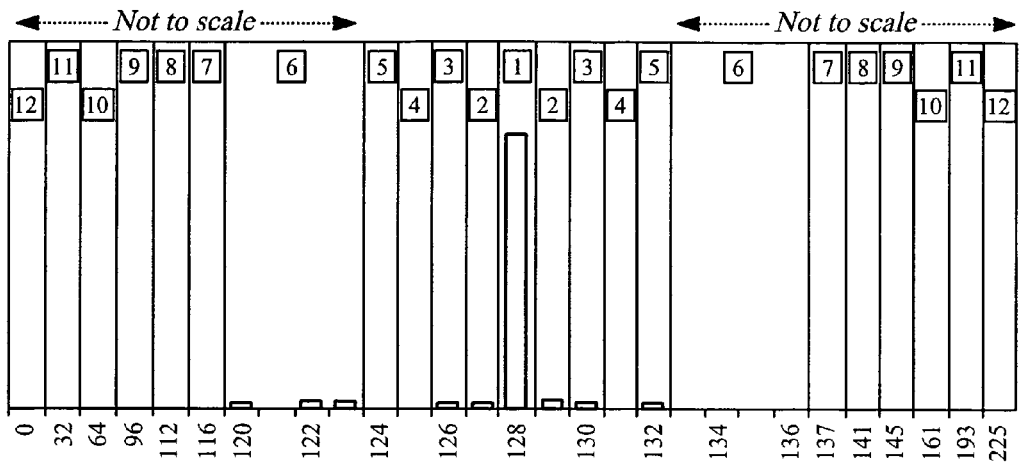
FIG. 9 illustrates a third variable length encoding scheme for use in the present invention.

FIG. 7, FIG. 8 and FIG. 9 illustrate three different encoding schemes, which have been developed experimentally from image data sets. Each scheme is a variable length entropy encoding scheme with different group structures. The histograms shown in each of these figures are taken from example data suitable for compression using the corresponding scheme.

The less random the data is the more centered the wavelet coefficients will be around 128. Higher compression can therefore be achieved for less random data by using shorter length codes for the coefficients around 128 and longer codes for coefficients far from 128. The first scheme, shown in FIG. 7, is used for more random data sets than the second data scheme shown in FIG. 8, which is, in turn, used for more random data sets than the third scheme shown in FIG. 9.

The example schemes could be refined further, based on larger sets of test data, and other encodings may be chosen for alternate embodiments. One such scheme might encode a string of several coefficients. E.g. two zeros, with a single value for data sets that are heavily biased towards numerically small values.

In another embodiment of the encoding scheme, the top left wavelet values, i.e. the "dc" terms, are not entropy encoded, but instead just stored directly as 8-bit values, since these generally have a near even distribution of values. For the de-compressor to be able to decode a particular tile of data, it needs to know the encoding scheme used for that tile. The first two bits, therefore, of the encoded tile data are used to store the encoding scheme as follows:

00=no compression

01=scheme 1

10=scheme 2

11=scheme 3

The decompression of an encoded data tile is traightforward: first the scheme is read from the first two bits. In the particular case where a tile's wavelet coefficients have not been entropy encoded, the decoding step can be skipped and the original data can be retrieved by reversing the wavelet transformation described previously. Otherwise, each of the tile's data elements has to be encoded first, involving the following steps:
1. Identifying the group by reading the encoded data element bit by bit until either a 0 is reached or the maximum number of group 1's have been read.
2. Mapping the group value succeeding the group id to its corresponding location in the [0,255] range.

In an alternative embodiment, the encoding scheme bits may be stored in a separate array, with one entry per tile, of memory or registers. This array may also contain details of the size of the compressed data for each tile so that an external memory bus can request the correct data transfer to decode the tile.

In another alternative embodiment, different channels may be entropy encoded with independent encoding schemes.

Due to the variable lengths of the encoded coefficients, the process of decoding of the coefficients is generally sequential. Although it can be possible to decode pairs of, say, the coefficients encoded with the shorter bit strings, it is extremely difficult to increase the number that can be done within one clock cycle. In an alternative embodiment, at least one additional parallel entropy decoder is included. The first portion of the symbols is decoded with the first entropy decoder and the second portion with the second decoder. A bit offset is also stored at the start of the compressed data so that the second decoder knows where the enconded symbols begin. Such an offset does reduce the compression efficiency, and thus such an embodiment trades decode speed against compression ratio. Note that the size of the offset is bounded as the data is never expanded. Further decoders and offsets could be used to further increase speed in alternate embodiments.

When compressing 8-bit per channel RGB(A) colour data, the compression ratio can be improved by converting the data to a different colour space that exploits correlation between the RGB colour channels. However, it is important that the colour space transformation is reversible, so that lossless image compression is possible.

One such model with RGB reversibility is the YCoCg-R colour model, as described by Malvar and Sullivan in "YCoCg-R: A Color Space with RGB Reversibility and Low Dynamic Range", Henrique Malvar and Gary Sullivan, Microsoft Corp, JVT PExt Ad Hoc Group Meeting: 22-24 Jul. 2003, Trondheim, (http://research.microsoft.com/users/malvar/papers/JVT-I014r3.pdf), the contents of which are incorporated herein by reference. A summary of the transformation from RGB to YcoCG is given below:

$C_o = R - B$ $t = B + (C_o \gg 1)$ $C_g = G - t$ $Y = t + (C_g \gg 1)$

This model decorrelates red from blue, and the green from the averaged red and blue channels and packs most of the colour information into one luminance (Y) channel. In YCoCg-R, the Co and Cg channels are expanded to 9 bits. Although the transformation could be done just using 8-bit modulo arithmetic, this significantly reduces the compression ratio for some images due to the discontinuities introduced by the wrapping around of values. Note also that the YCoCg-R requires additional temporary storage for the 't' value.

Another known colour model is the Reversible Colour Transform (RCT) of JPEG2000 described in "A Reversible Color Transform for 16-bit-color Picture Coding", Li et al, Proceedings of the 12$^{th}$ annual ACM international conference on Multimedia, 2004, the contents of which are incorporated herein by reference. The RCT is specified as:

$$Y_0 = \frac{R + 2G + B}{4}$$

$$Y_1 = B - G$$

$$Y_2 = R - G$$

To prevent problems with 8-bit only mathematics, the YCoCg/RCT models may be modified. The new model, which has been named YCmCn, consists of one luminance and two colour components (Cm, Cn) similar to the YCoCg/RCT models. The transformation from the RGB colour space is defined as follows:

$$Cm = r - g$$

$$Cn = b - g$$

$$Y = g - \text{Modulosafe\_div4}(Cm+Cn) \; \{\approx g - (Cm+Cn)/4\}$$

In both the YCoCg and RCT colour transforms, there are division operations. Great care has to be taken when computing divisions using the 8-bit arithmetic. The division by four in the transformation above has thus been replaced by the Modulosafe_div4 operator, which will be described later. Computations done with 8-bit values can easily result in values outside the 8-bit range (i.e. over-underflow). The modulo arithmetic 'maps' those values back into the 8-bit range introducing 'ambiguities'.

For example, let us assume that we have the results of two computations, −12 and 6, and we wish to compute their 'average'. Ideally, we would expect a value corresponding to (−12+6)/2=−3. Now −12 is congruent to 244 modulo 256, and so if we try to average the remapped values we would obtain (244+6)/2=125, when we actually expect a value of 253 (≡−3 mod 256).

The solution to this problem can be found considering that the 8-bit range [0,255] forms a circle when using modulo arithmetic. This means there are always two possible averages for a pair of values. If one assumes the two computed results are meant to represent nearby values (which is the more typical situation), i.e. that values spaced further apart than 128 are the result of a single 'wrap around' of one of the two values, then the 'correct' average can be computed by choosing the average value on the shorter path around the circle. This is achieved with the following:

$$ClosestAverage(v_1, v_2) = \begin{cases} \frac{v_1 + v_2}{2} + 128 & \text{when } |v_1 - v_2| \geq 128 \\ \frac{v_1 + v_2}{2} & \text{all other cases} \end{cases}$$

Furthermore, a 'divide by 2' operator is defined that assumes values in the range [128, 255] represent negative values:

$$DividebyTwo(v) = \begin{cases} 128 + \frac{v}{2} & \text{if}(v \geq 128) \\ \frac{v}{2} & \text{all other cases} \end{cases}$$

Assuming that Cm and Cn are both close to zero due to the expected high correlation between the R and G and the B and G channels respectively, the following operation can be defined:

Modulosafe_div4(Cm+Cn)=DivideByTwo(ClosestAverage(Cm,Cn))

This works well in practice because, in most cases, the unconstrained values of both Cm and Cn, i.e. if we were using full precision mathematics and were not masking to 8-bit precision, lie in the range [−128,127] and are not spaced further apart than 128. That is, in most cases the result of the ClosestAverage(Cm, Cn) is correct and stays in the range [−128,127], where negative values map to values in the range [128,255]. This, in turn, means that the assumption for the DivideByTwo operator holds true. However, the operations are still reversible even if the unconstrained values are outside the [−128,127] range.

The final RGB to YCmCn colour transformation can thus be stated as:

$$Cm = r - g$$

$$Cn = b - g$$

Y=g−DivideByTwo(ClosestAverage(Cm,Cn),0)

This is a fully reversible colour transformation that exploits correlation between the red and the green and the green and the blue channels. In the majority of test RGB images, these have been found to be the most significant pair-wise channel correlations; there was notably less correlation between the blue and the red channels.

To compress an RGB(A) image with 8 bits per channel, its RGB channels are first transformed to the YCmCn space. Each channel is then wavelet transformed and compressed separately as described above—this can include an optional, alpha channel. Retrieving the original image is straightforward: after the decoding and inverse wavelet transformation the RGB channels are recovered by reversing the YCmCn transform:

g=Y+DivideByTwo(ClosestAverage(Cm,Cn),0)

b=Cn+g r=Cm+g.

To ensure the correct difference computation in the wavelet transformation when transforming the Y, Cm and Cn channels, the prediction used in prior art linear wavelets, i.e.:

$$P_O = \frac{(v_{E\_left} + v_{E\_right})}{2}$$

is replaced with $$P_o = \text{ClosestAverage}(v_{E\_left}, v_{E\_right}).$$

This is because there is a high probability that the YcmCn transformation will result in at least one of $v_{E\_left}$ or $v_{E\_right}$ being 'negative', and so the standard average computation will produce a poor result in terms of compression.

Figure 10:
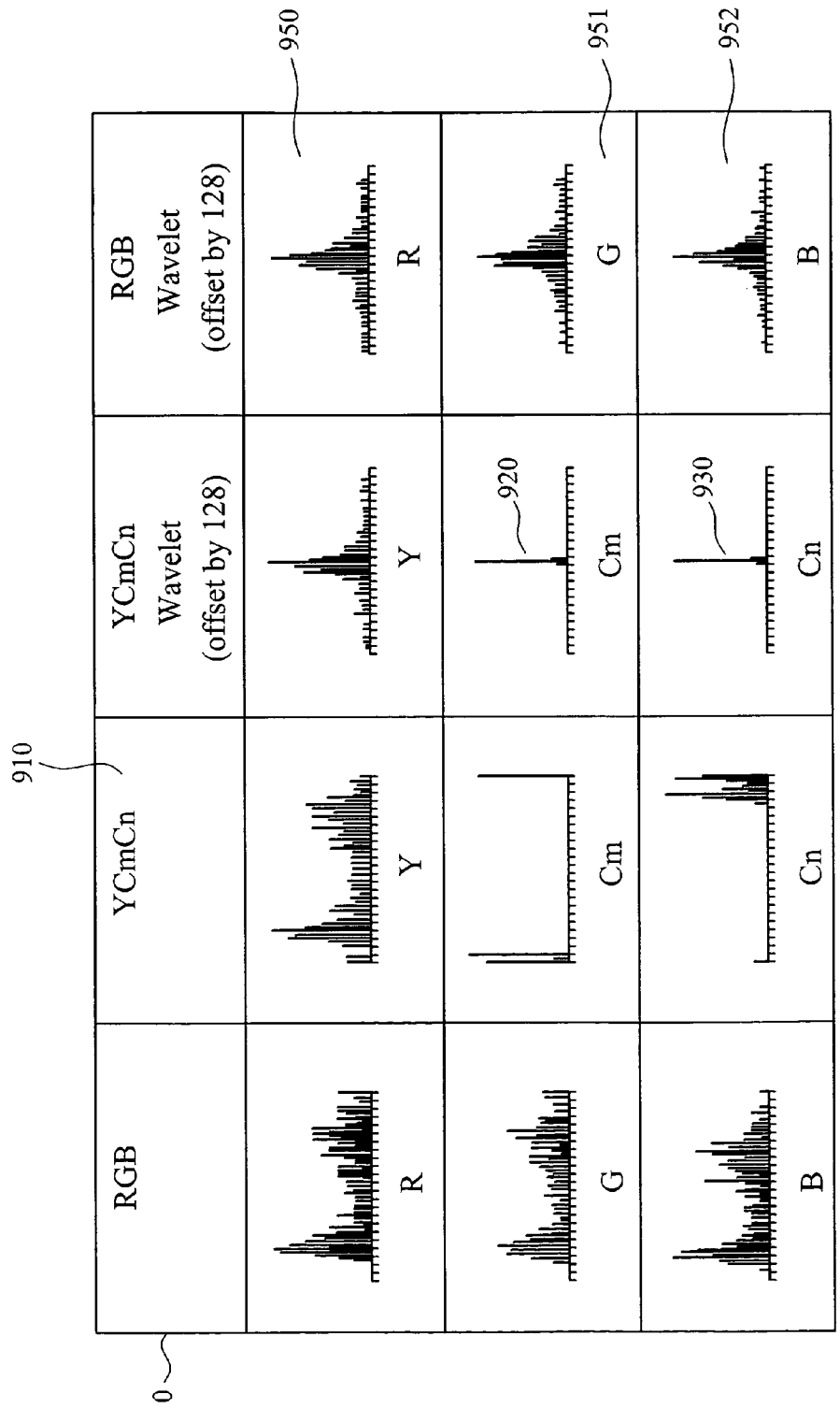
FIG. 10 illustrates the difference between RGB channel data after wavelet transformation and converted YCmCn data after wavelet transformation.

FIG. 10 shows histograms comparing wavelet results performed on RGB, 900, and the equivalent YCmCn data, 910. It can be clearly seen that the standard deviation is much lower for the YCmCn wavelets' Cm and Cn channels, 920 and 930, than it is in the colour channels of the RGB wavelets, (950 through 952). This means that entropy encoding the Y, Cm and Cn wavelet output results in significantly more compressed output than encoding the R, G and B wavelet results.

In an alternative embodiment, the YCmCn colour transformation is replaced with the JPEG-LS colour transformation method described in Weinberger et al, "The LOCO-I Lossless Image Compression Algorithm: Principles and Standardization into JPEG-LS", but adapted to work modulo 256. For many RGB(A) colour images, it has been found that using the JPEG-LS transformation mod 256 yields better compression results than YCmCn. The JPEG-LS transformation decorrelates the red and the blue from the green channel using the following operations:

$$r' = r - g$$

$$b' = b - g$$

$$g' = g$$

The reversal of this transformation is trivial. In the wavelet transformation's prediction step, the closest average function has to be used as the r and b values might have wrapped around in the JPEG-LS transformation.

In the preferred embodiment thus described, the colour transformation is performed prior to the wavelet transformation. In another embodiment, the wavelet transformation is done first and then one or more different colour transforms are performed in parallel. The colour transformation that results in the best compression for each tile is then chosen to represent that tile.

Figure 11:
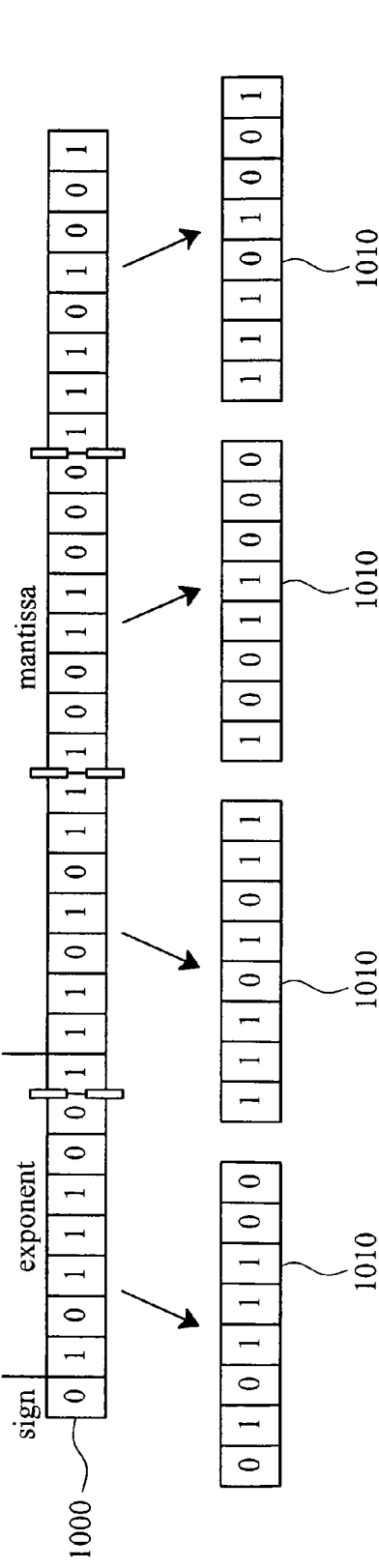
FIG. 11 illustrates splitting 32-bit data into 8-bit data channels.

To allow re-use of the same hardware, thus reducing silicon costs, IEEE standard 754 32-bit floating point data is compressed by splitting each 32-bit value up into four separate 8-bit components and then doing the wavelet transformation independently for each component. An example of such splitting is shown in FIG. 11. The 32-bit value 1000 is shown split into four 8-bit values 1010.

Experiments have been conducted with various non-trivial mapping schemes. However, in terms of compression rate, a simple splitting is remarkably effective.

Normally, wavelet transformations would be performed directly on the float data, which would imply expensive floating-point mathematical units and involve loss of precision due to floating point rounding. Alternatively, the 32-bit float data could be interpreted as 32-bit integer data (modulo $2^{32}$) however 32-bit mathematics is still expensive and would involve additional hardware.

Tests have showed that, on average, when compressing split 32-bit HDR or z-buffer data, a 2% higher compression ratio is achieved if the prediction step of the wavelet transformation uses the 'closest average' function described previously.

This may seem odd because no wrapping around of values occurs before the wavelet transformation, however, because the mantissa is split into separate 8-bit channels, smooth transitions between neighbouring values introduce a wrap around effect in some channels, creating a 'sharp edge'. The closest average function correctly handles these cases by treating the wraparound discontinuities as smooth transitions. The simple average computation would lead to poor predictions close to these discontinuities, resulting in much larger wavelet coefficients.

When compressing 32-bit z-buffer data, a higher compression can be achieved by computing differences of differences already computed in earlier wavelet transformation steps, as is more standard in prior art wavelet processing. This is achieved by simply setting the row and column strides to one in the algorithm described in FIG. 5.

Figure 12:
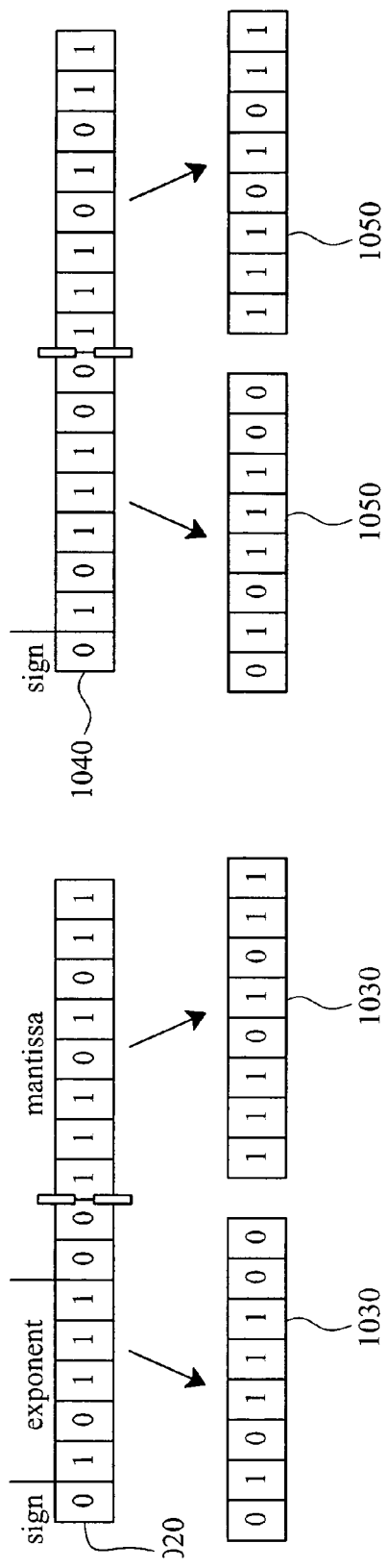
FIG. 12 illustrates splitting 16-bit data into 8-bit data channels.

16-bit floating-point and 16-bit integer data are compressed using the same straightforward splitting technique used for standard 32-bit floats as described above, with preferred embodiments shown in FIG. 12. The 16-bit floating point data 1020 and 16-bit integer data 040 are split into 8-bit components 1030 and 1050 respectively.

Similar to the 32-bit case, experiments with various non-trivial mapping schemes for 16-bit float data have not shown an improvement over the simple splitting.

The compression ratio, for a preferred embodiment using 2×2 Multi-Sampled Antialiasing (MSAA) raw data, is improved by using a Haar wavelet instead of a linear wavelet for the first levels of the wavelet transformation, i.e. whilst still processing data entirely contained inside a single pixel. In embodiments using higher levels of MSAA sampling, more initial Haar steps would be used.

A Haar wavelet assumes the data to be compressed is constant across neighbouring samples. During its lifting step, the odd element is predicted with its left even neighbour and the difference between the predicted and the actual odd element is stored in the odd element:

$$P_{v\_odd} = v_{even}$$

$$\text{diff} = v_{odd} - P_{v\_odd}$$

$$v_{odd} = \text{diff}$$

Just as when computing the linear wavelet, the update step of the Haar transformation is advantageously omitted because it does not improve compression performance.

Figure 13:
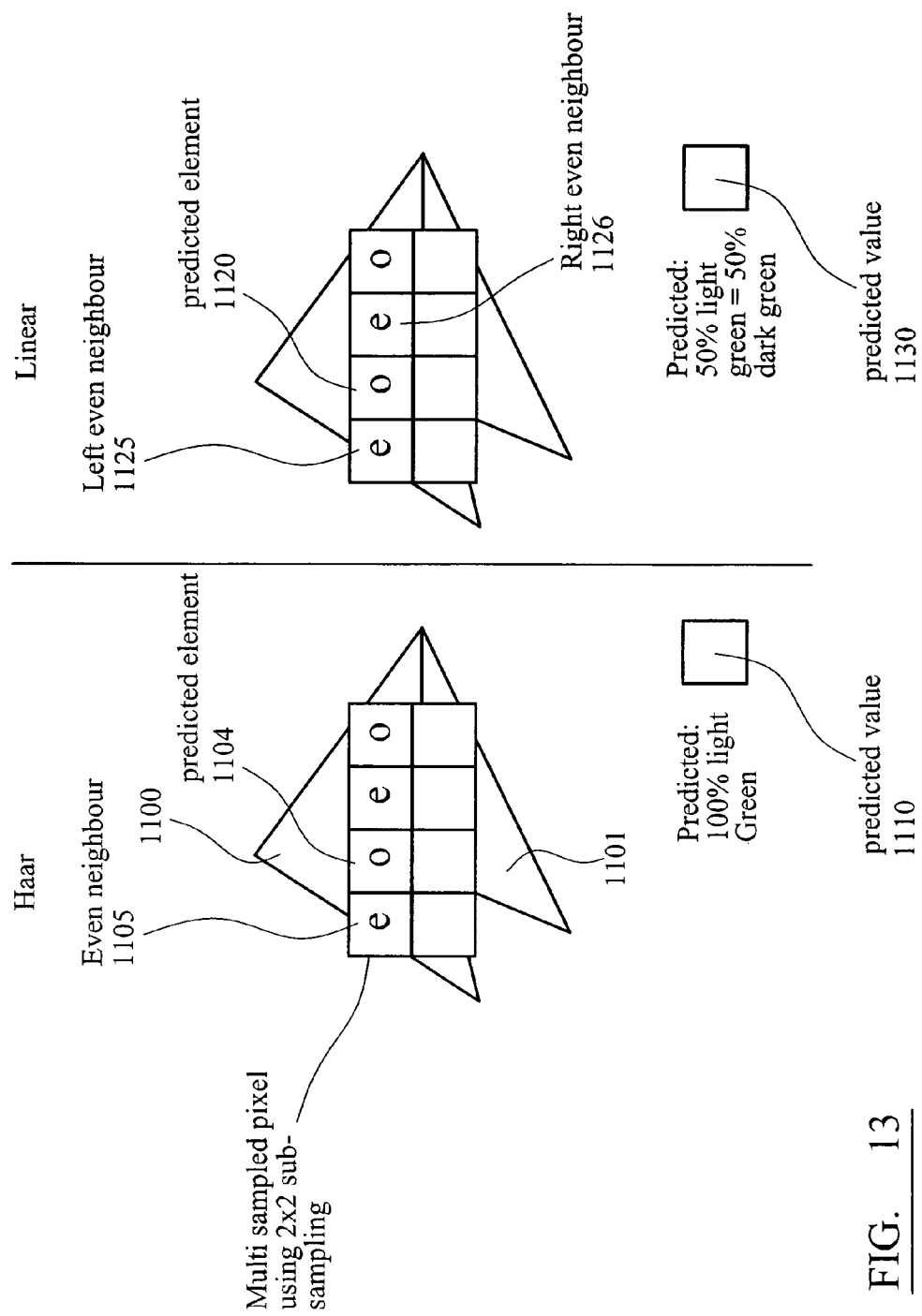
FIG. 13 shows a comparison between a Haar wavelet transformation and a linear wavelet transformation.

The Haar wavelet is beneficial for the MSAA raw data as, within each over-sampled pixel, there is a very high probability of replicated colours. Because a linear wavelet uses both neighbouring even samples for the prediction, it would thus predict a linear blend across the MSAA data's 2×2 block's borders. This means odd samples in the first wavelet level are usually predicted with less error when using a Haar instead of a linear wavelet. This is illustrated in FIG. 13, which shows a pair of 2×2 multi-sampled pixels side by side. Both pixels are crossed by the same two triangles, 1100 and 1101. The former varies from light to dark green due to shading or texturing but, as MSAA is being performed, the colour for each triangle is evaluated only once per pixel and replicated to all samples in the pixel that are covered by the triangle. For the purposes of illustration, we just consider just the application of the wavelet to the first row of data.

On the left side of FIG. 13 a Haar wavelet example is shown. The odd pixel to be predicted, 1104, obtains its prediction value purely from the left even neighbour, 1105, resulting in a 100% perfect prediction, 1110, of light green, meaning that a zero coefficient can be stored.

For comparison, the right hand side of FIG. 13 uses a linear wavelet. The same predicted element, 1120, this time obtains its prediction from the average of two different even samples, 1125 and 1126, which means that it averages light green from 1125, and dark green from 1126, to produce a mid-intensity green predicted result, 1130. This means that a non-zero wavelet coefficient will be stored requiring more bits to encode. As MSAA typically has repeated sample values inside each pixel, prediction using values in a neighbouring pixel is more likely to be counterproductive.

To further increase the compression ratio, the technique can be extended to support a lossy compression option. This can be achieved by zeroing less significant bits in the wavelet coefficients prior to encoding with a modified encoding scheme. The smaller number of possible values thus allows a greater compression ratio. More drastically, some of the higher frequency terms could be quantised to zero, which will also have a similar effect. However, the wavelet 'update' step, which is not used in the lossless version, may be required to maintain quality.

The lossless compression method of the present invention is also applicable to video processing, i.e., compression/decompression systems, such as that utilising, e.g., MPEG2, MPEG4, and H.264, wherein several reference frames must be maintained and regularly referenced for both the compression and decompression processing steps. Accessing these frames (in pseudo random order) can represent a high bandwidth cost which can be reduced significantly by the method herein described.

The invention claimed is:

1. A method for compressing an electronic two-dimensional data set in a graphics rendering system comprising the steps of:
    dividing the data set with a reformatter into a plurality of data arrays;
    performing a wavelet transformation on each array using modulo arithmetic with a parallel arithmetic logic unit to provide a plurality of wavelet coefficients; and
    encoding at least some of the wavelet coefficients with an encoder using an entropy encoding scheme.

2. The method according to claim 1, wherein the data set is an image data set and each data array corresponds to a separate and continuous area of an image.

3. The method according to claim 1 further including the step of converting the data set into a predetermined data format prior to performing the wavelet transformation.

4. The method according to claim 3, wherein the predetermined data format is an 8-bit unsigned integer data format.

5. The method according to claim 3, wherein the converting step includes the step of splitting larger data units into a plurality of smaller data units.

6. The method according to claim 5, wherein the splitting step comprises the step of splitting the larger data units into a plurality of separate data channels.

7. The method according claim 1, wherein the performing step and the encoding step are performed on different data arrays in parallel.

8. The method according to claim 6, wherein the data set is a single data channel of a multiple data channel image and each of the steps is applied to a plurality of the data channels.

9. The method according to claim 8, wherein the image comprises colour data and the method further includes the step of converting the colour data into a different colour space using a colour transformation.

10. The method according to claim 9, wherein the colour transformation is performed using modulo arithmetic.

11. The method according to claim 1 further including the steps of assessing the wavelet coefficients and selecting the entropy encoding scheme on the basis of the results of the assessment of the wavelet coefficients.

12. The method according to claim 11, wherein the coefficients are assessed for each array and the entropy encoding scheme chosen for each array.

13. The method according to claim 11, wherein the assessing step comprises the step of assessing a distribution of the wavelet coefficients.

14. The method according to claim 1, wherein the wavelet transformation is a linear wavelet transformation or a Haar wavelet transformation and the method further includes the step of selecting the linear wavelet transformation or the Haar wavelet transformation.

15. The method according to claim 1, wherein the performing step includes the step of performing a plurality of wavelet transformation operations on each data array.

16. The method according to claim 1, wherein the modulo arithmetic is a modulo n arithmetic, where n is a positive integer and an average of two values $V_1$ and $V_2$ is calculated as:

$$[(V_1+V_2)/2] \bmod n \text{ when } |V_1-V_2|<n/2, \text{ and } [(V_1+V_2)/2+n/2] \bmod n \text{ when } |V_1-V_2|\geq n/2.$$

17. An apparatus for compressing an electronic two-dimensional data set comprising:
    means for dividing the data set into a plurality of data arrays; and
    a compressor unit including means for performing a wavelet transformation using modulo arithmetic on each data array to output a plurality of wavelet coefficients for each data array and means for encoding at least some of the plurality of the wavelet coefficients using an entropy encoding scheme.

18. The apparatus according to claim 17, wherein the apparatus is a graphics rendering system.

19. The apparatus according to claim 17, wherein the electronic data set is an image data set and each data array corresponds to a separate and continuous area of an image.

20. The apparatus according to claim 17, further including a reformatting unit for converting the data set into data channels having a predetermined data format prior to performing the wavelet transformation.

21. The apparatus according to claim 17, further including means for performing a colour transformation on colour image data.

22. The apparatus according to claim 17, further including means for assessing the wavelet coefficients and selecting the entropy encoding scheme on the basis of the results of the assessment of the wavelet coefficients.

23. The apparatus according to claim 17, wherein the modulo arithmetic is a modulo n arithmetic, where n is a positive integer and an average of two values $V_1$ and $V_2$ is calculated as:

$$[(V_1+V_2)/2] \bmod n \text{ when } |V_1-V_2|<n/2, \text{ and } [(V_1+V_2)/2+n/2] \bmod n \text{ when } |V_1-V_2|\geq n/2.$$

24. A method of decompressing an electronic two-dimensional data set in a graphics rendering system comprising the steps of:
    decoding the data set with a decoder using at least one entropy decoding scheme to produce a plurality of sets of coefficients;

performing an inverse wavelet transformation on the coefficients with a parallel arithmetic logic unit using a modulo arithmetic to produce a plurality of data arrays; and joining the plurality of the data arrays with a reformatter to produce the two-dimensional data set.

25. An apparatus for decompressing an electronic two-dimensional data set comprising:

a decompressor unit including means for decoding the data set using at least one entropy decoding scheme to produce a plurality of sets of coefficients and means for performing an inverse wavelet transformation on the coefficients using modulo arithmetic to produce a plurality of data arrays; and means for joining the plurality of data arrays to produce the two-dimensional data set.

26. A method for compressing an electronic two-dimensional data set in a graphics rendering system comprising the steps of:

dividing the data set with a reformatter into a plurality of data arrays;

performing a wavelet transformation on each array with a parallel arithmetic logic unit to provide a plurality of wavelet coefficients for each array;

processing each plurality of the wavelet coefficients with a coefficient processor to produce a value for each array; and selecting an encoding scheme for each array based on the value for that array.

27. The method according to claim 26, wherein the selecting step comprises the step of selecting one encoding scheme from a set of possible encoding schemes and, if none of the encoding schemes result in data compression, not selecting any encoding scheme.

28. An apparatus for compressing an electronic two-dimensional data set comprising:

means for dividing the data set into a plurality of data arrays; and a compressor unit including means for performing a wavelet transformation on each data array to output a plurality of wavelet coefficients for each data array, a processor for processing the coefficients to produce a value for each array, and means for selecting based on the value an encoding scheme for encoding the wavelet coefficients.

29. A method for compressing an electronic two-dimensional data set in a graphics rendering system comprising the step of:

performing a wavelet transformation on the data set using modulo arithmetic with a parallel arithmetic logic unit to produce a plurality of coefficients; and encoding the coefficients with an encoder using an entropy code.

30. A method for compressing an electronic two-dimensional data set in a graphics rendering system comprising the step of:

performing a wavelet transformation on the data set with a parallel arithmetic logic unit to provide a plurality of coefficients; and encoding the coefficients with an encoder using an entropy code, wherein the wavelet transformation excludes an update step.

* * * * *